United States Patent
Duluk, Jr. et al.

(10) Patent No.: US 8,922,555 B2
(45) Date of Patent: Dec. 30, 2014

(54) PIXEL SHADER OUTPUT MAP

(75) Inventors: Jerome F. Duluk, Jr., Palo Alto, CA (US); Jesse David Hall, Santa Clara, CA (US); Patrick R. Brown, Wake Forest, NC (US); Mark Dennis Stadler, Los Altos, CA (US)

(73) Assignee: NVIDIA Corporation, Santa Clara, CA (US)

( * ) Notice: Subject to any disclaimer, the term of this patent is extended or adjusted under 35 U.S.C. 154(b) by 949 days.

(21) Appl. No.: 12/898,998

(22) Filed: Oct. 6, 2010

(65) Prior Publication Data

US 2011/0080407 A1    Apr. 7, 2011

Related U.S. Application Data

(60) Provisional application No. 61/249,516, filed on Oct. 7, 2009.

(51) Int. Cl.
*G06T 15/00* (2011.01)

(52) U.S. Cl.
CPC ........................ *G06T 15/005* (2013.01)
USPC .......... 345/426; 345/418; 345/686; 345/530; 345/531; 345/537; 345/538; 345/559; 345/563

(58) Field of Classification Search
None
See application file for complete search history.

(56) References Cited

U.S. PATENT DOCUMENTS

| | | | |
|---|---|---|---|
| 6,724,394 B1 * | 4/2004 | Zatz et al. | 345/581 |
| 6,765,584 B1 * | 7/2004 | Wloka et al. | 345/584 |
| 6,826,663 B2 * | 11/2004 | Perego et al. | 711/156 |
| 7,006,101 B1 * | 2/2006 | Brown et al. | 345/561 |
| 7,034,829 B2 * | 4/2006 | Lindholm et al. | 345/427 |
| 7,528,843 B1 * | 5/2009 | Kilgard et al. | 345/582 |
| 7,681,077 B1 * | 3/2010 | Eitzmann et al. | 714/21 |
| 2005/0122332 A1 * | 6/2005 | Boyd et al. | 345/501 |
| 2005/0243094 A1 * | 11/2005 | Patel et al. | 345/506 |
| 2005/0280654 A1 * | 12/2005 | Boyd et al. | 345/559 |
| 2008/0252652 A1 * | 10/2008 | Jiao et al. | 345/582 |
| 2009/0213128 A1 * | 8/2009 | Chen | 345/503 |
| 2009/0256849 A1 * | 10/2009 | Boland et al. | 345/522 |

OTHER PUBLICATIONS

Direct3D 11 Shader Reflection Interface, Zink, 2009.*
Shader Stages, Microsoft, 2006.*
Pipelines for Direct3D Version 11, Microsoft, 2009.*
Configuring Blending Functionality, Microsoft, 2011.*
D3D11_BLEND_DESC Structure, Microsoft, 2011.*
Output-Merger Stage, Microsoft, 2008.*
Bitwise Operations in C, Farrell, 2001.*

* cited by examiner

*Primary Examiner* — David Zarka
*Assistant Examiner* — Phong Nguyen
(74) *Attorney, Agent, or Firm* — Patterson & Sheridan, LLP

(57) ABSTRACT

One embodiment of the present invention sets forth a technique for storing only the enabled components for each enabled vector and writing only enabled components to one or more specified render targets. A shader program header (SPH) file provides per-component mask bits for each render target. Each enabled mask bit indicates that the pixel shader generates the corresponding component as an output to the raster operations unit. In the hardware, the per-component mask bits are combined with the applications programming interface (API)-level per-component write masks to determine the components that are updated by the shader program. The combined mask is used as the write enable bits for components in one or more render targets. One advantage of the combined mask is that the components that are not updated are not forwarded from the pixel shader to the ROP, thereby saving bandwidth between those processing units.

18 Claims, 14 Drawing Sheets

PIXEL SHADER OUTPUT MAP

CROSS-REFERENCE TO RELATED APPLICATIONS

This application claims priority benefit to U.S. provisional patent application titled, "Pixel Shader Output Map," filed on Oct. 7, 2009 and having Ser. No. 61/249,516.

BACKGROUND OF THE INVENTION

1. Field of the Invention

Embodiments of the invention relate generally to graphics processing, and more specifically to selecting and transmitting components for output by a pixel shader.

2. Description of the Related Art

Prior art pixel shaders in three-dimensional (3D) graphics application programming interfaces (APIs) store and output component vectors of multiple components to a raster operations unit for blending operations and storage in a frame buffer. Vectors may be enabled or disabled for output to each render target (frame buffer) and one or more of the components in each vector may be individually disabled. Conventional pixel shaders store and output all of the multiple components for each enabled vector, potentially wasting storage resources and bandwidth when one or more of the components are disabled for a vector. Additionally, disabled components that are output should not be written to a render target since the data for the component is undetermined.

To avoid this overhead, implementations of 3D graphics APIs may recompile pixel shaders based on the vector and component enabled described above. However, such an approach involves a substantial amount of central processing unit (CPU) overhead. Substantial computation is required to track the various combinations of pixel shader and graphics API state, and to perform such recompilations whenever necessary.

Accordingly, what is needed in the art is a technique for storing only the enabled components for each enabled vector without shader recompilation and ensuring that the render target is written with enabled components, so that non-enabled component data stored in the render target remains unchanged.

SUMMARY OF THE INVENTION

A system and method of storing only the enabled components for each enabled vector and writing only enabled components to one or more specified render targets. A shader program header (SPH) file provides per-component mask bits for each render target. Each enabled mask bit indicates that the pixel shader generates the corresponding component as an output to the raster operations unit. In the hardware, the per-component mask bits are combined with the applications programming interface (API)-level per-component write masks to determine the components that are updated by the shader program. The combined mask is used as the write enable bits for components in one or more render targets. One advantage of the combined mask is that the components that are not updated are not forwarded from the pixel shader to the raster operations unit (ROP), thereby saving bandwidth between those processing units.

Various embodiments of a method of the invention for selecting and transmitting components for render targets, includes generating only components of a vector that are enabled according to a shader program header and storing the components of the vector in a set of registers. A set of components is selected from the components of the vector based on a component update mask. The set of components is transmitted to a render target and written to the render target.

Various embodiments of the invention include a system for selecting and transmitting components for render targets includes a memory storing the render targets and a pixel shader. The pixel shader is configured to generate only components of a vector that are enabled according to a shader program header and store the components of the vector in a set of registers. The pixel shader also selects a set of components from the components of the vector based on a component update mask and transmits the set of components to a render target. A raster operations unit is configured to write the set of components to the render target.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

System Overview

Figure 1:
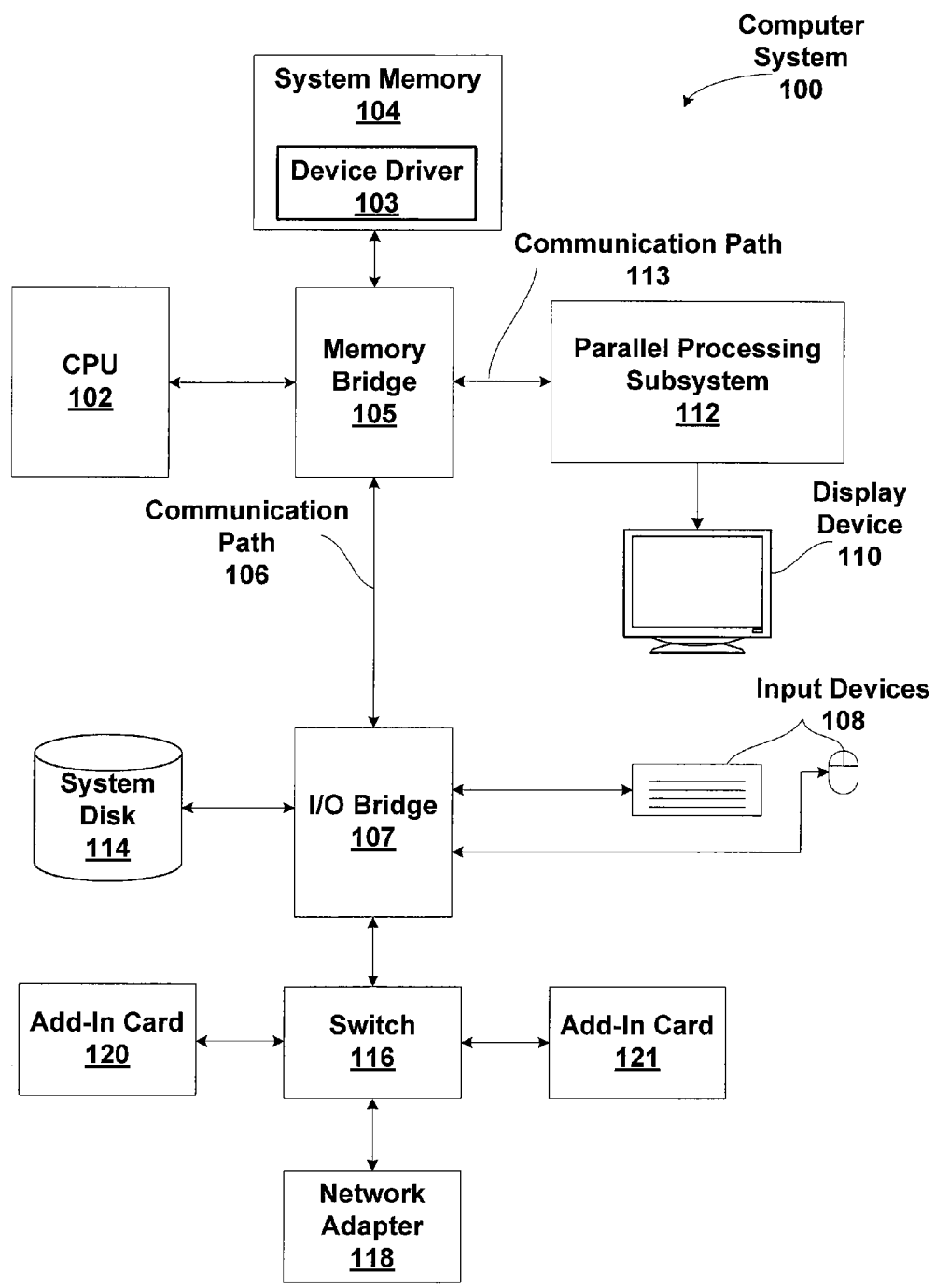
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via an interconnection path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via path 106 and memory bridge 105. A parallel processing subsystem 112 is coupled to memory bridge 105 via a bus or other communication path 113 (e.g., a PCI Express, Accelerated Graphics Port, or HyperTransport link); in one embodiment parallel processing subsystem 112 is a graphics subsystem that delivers pixels to a display device 110 (e.g., a conventional CRT or LCD based monitor). A system disk 114 is also connected to I/O bridge 107. A switch 116 provides connections between I/O bridge 107 and other components such as a network adapter 118 and various add-in cards 120 and 121. Other components (not explicitly shown), including USB or other port connections, CD drives, DVD drives, film recording devices, and the like, may also be connected to I/O bridge 107. Communication paths interconnecting the various components in FIG. 1 may be implemented using any suitable protocols, such as PCI (Peripheral Component Interconnect), PCI-Express, AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements, such as the memory bridge 105, CPU 102, and I/O bridge 107 to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip. Large embodiments may include two or more CPUs 102 and two or more parallel processing systems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
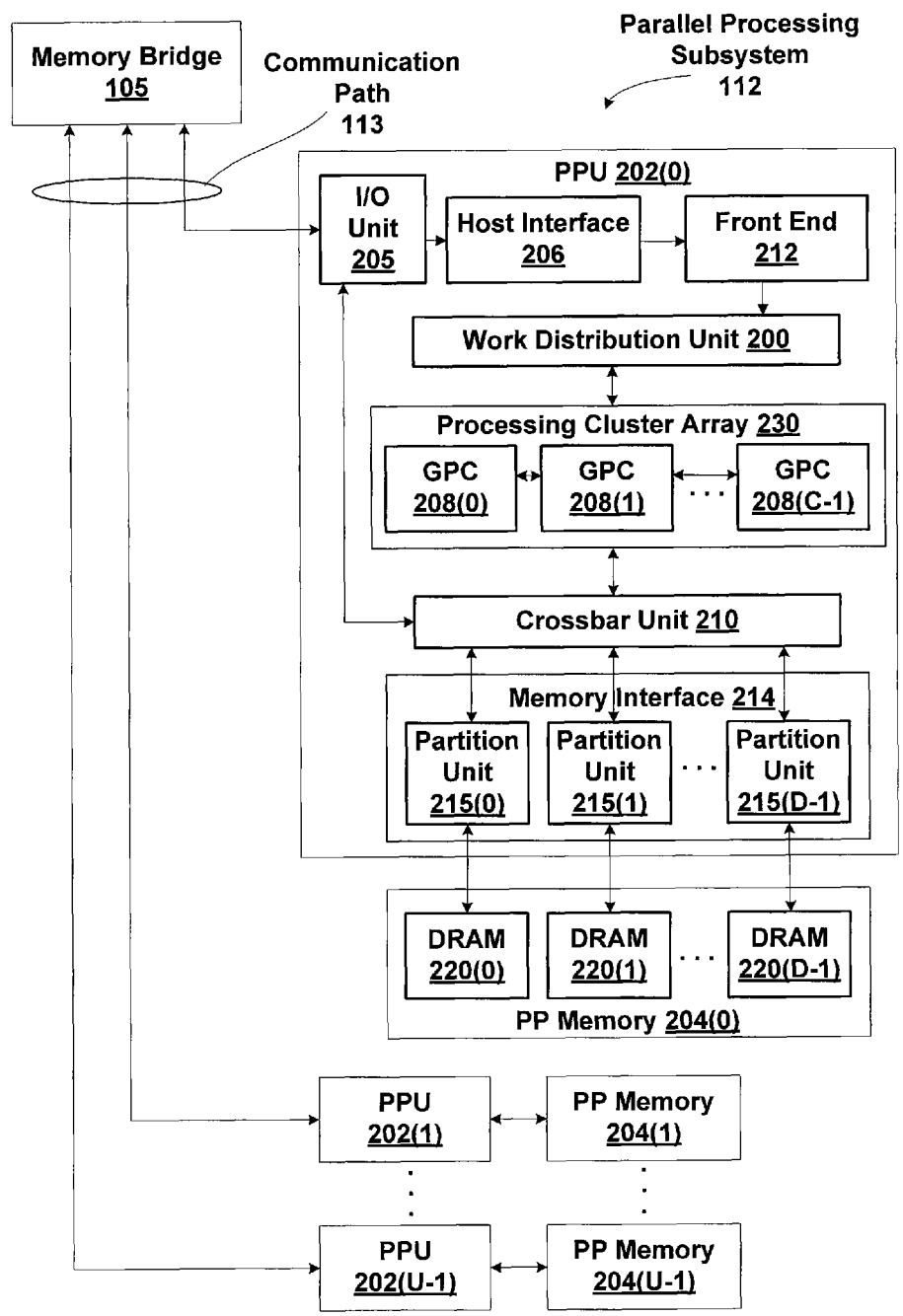
FIG. 2 is a block diagram of a parallel processing subsystem for the computer system of FIG. 1, according to one embodiment of the present invention.

FIG. 2 illustrates a parallel processing subsystem 112, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where U≥1. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 1, in some embodiments, some or all of PPUs 202 in parallel processing subsystem 112 are graphics processors with rendering pipelines that can be configured to perform various tasks related to generating pixel data from graphics data supplied by CPU 102 and/or system memory 104 via memory bridge 105 and bus 113, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have its own dedicated parallel processing memory device(s) or no dedicated parallel processing memory device(s). One or more PPUs 202 may output data to display device 110 or each PPU 202 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a pushbuffer (not explicitly shown in either FIG. 1 or FIG. 2) that may be located in system memory 104, parallel processing memory 204, or another storage location accessible to both CPU 102 and PPU 202. PPU 202 reads the command stream from the pushbuffer and then executes commands asynchronously relative to the operation of CPU 102.

Referring back now to FIG. 2, each PPU 202 includes an I/O (input/output) unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCI-EXPRESS link, in which dedicated lanes are allocated to each PPU 202, as is known in the art. Other communication paths may also be used. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each pushbuffer and outputs the work specified by the pushbuffer to a front end 212.

Each PPU 202 advantageously implements a highly parallel processing architecture. As shown in detail, PPU 202(0) includes a processing cluster array 230 that includes a number C of general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. For example, in a graphics application, a first set of GPCs 208 may be allocated to perform tessellation operations and to produce primitive topologies for patches, and a second set of GPCs 208 may be allocated to perform tessellation shading to evaluate patch parameters for the primitive topologies and to determine vertex positions and other per-vertex attributes. The allocation of GPCs 208 may vary dependent on the workload arising for each type of program or computation.

GPCs 208 receive processing tasks to be executed via a work distribution unit 200, which receives commands defining processing tasks from front end unit 212. Processing tasks include indices of data to be processed, e.g., surface (patch) data, primitive data, vertex data, and/or pixel data, as well as state parameters and commands defining how the data is to be processed (e.g., what program is to be executed). Work distribution unit 200 may be configured to fetch the indices corresponding to the tasks, or work distribution unit 200 may receive the indices from front end 212. Front end 212 ensures that GPCs 208 are configured to a valid state before the processing specified by the pushbuffers is initiated.

When PPU 202 is used for graphics processing, for example, the processing workload for each patch is divided into approximately equal sized tasks to enable distribution of the tessellation processing to multiple GPCs 208. A work distribution unit 200 may be configured to produce tasks at a frequency capable of providing tasks to multiple GPCs 208 for processing. By contrast, in conventional systems, processing is typically performed by a single processing engine, while the other processing engines remain idle, waiting for the single processing engine to complete its tasks before beginning their processing tasks. In some embodiments of the present invention, portions of GPCs 208 are configured to perform different types of processing. For example a first portion may be configured to perform vertex shading and topology generation, a second portion may be configured to perform tessellation and geometry shading, and a third portion may be configured to perform pixel shading in screen space to produce a rendered image. Intermediate data produced by GPCs 208 may be stored in buffers to allow the intermediate data to be transmitted between GPCs 208 for further processing.

Memory interface 214 includes a number D of partition units 215 that are each directly coupled to a portion of parallel processing memory 204, where D≥1. As shown, the number of partition units 215 generally equals the number of DRAM 220. In other embodiments, the number of partition units 215 may not equal the number of memory devices. Persons skilled in the art will appreciate that DRAM 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the DRAMs 220 within parallel processing memory 204. Crossbar unit 210 is configured to route the output of each GPC 208 to the input of any partition unit 215 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. In the embodiment shown in FIG. 2, crossbar unit 210 is directly connected with I/O unit 205. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI-EXPRESS) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more of PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Processing Cluster Array Overview

Figure 3A:
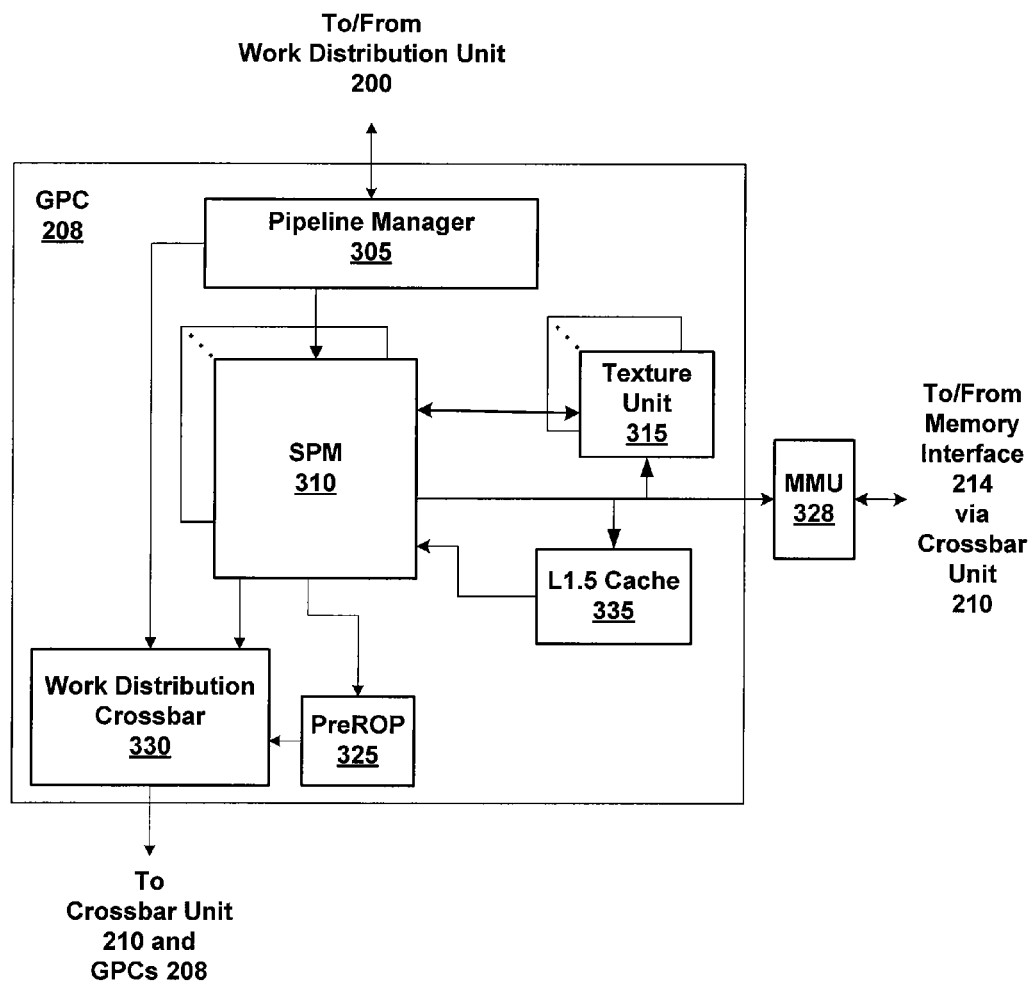
FIG. 3A is a block diagram of a GPC within one of the PPUs of FIG. 2, according to one embodiment of the present invention.

FIG. 3A is a block diagram of a GPC 208 within one of the PPUs 202 of FIG. 2, according to one embodiment of the present invention. Each GPC 208 may be configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the GPCs 208. Unlike a SIMD execution regime, where all processing engines typically execute identical instructions, SIMT execution allows different threads to more readily follow divergent execution paths through a given thread program. Persons skilled in the art will understand that a SIMD processing regime represents a functional subset of a SIMT processing regime.

Operation of GPC 208 is advantageously controlled via a pipeline manager 305 that distributes processing tasks to streaming multiprocessors (SPMs) 310. Pipeline manager 305 may also be configured to control a work distribution crossbar 330 by specifying destinations for processed data output by SPMs 310.

In one embodiment, each GPC 208 includes a number M of SPMs 310, where M≥1, each SPM 310 configured to process one or more thread groups. Also, each SPM 310 advantageously includes an identical set of functional execution units (e.g., arithmetic logic units, and load-store units, shown as Exec units 302 and LSUs 303 in FIG. 3C) that may be pipelined, allowing a new instruction to be issued before a previous instruction has finished, as is known in the art. Any combination of functional execution units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional-unit hardware can be leveraged to perform different operations.

The series of instructions transmitted to a particular GPC 208 constitutes a thread, as previously defined herein, and the collection of a certain number of concurrently executing threads across the parallel processing engines (not shown) within an SPM 310 is referred to herein as a "warp" or "thread group." As used herein, a "thread group" refers to a group of threads concurrently executing the same program on different input data, with one thread of the group being assigned to a different processing engine within an SPM 310. A thread group may include fewer threads than the number of processing engines within the SPM 310, in which case some processing engines will be idle during cycles when that thread group is being processed. A thread group may also include more threads than the number of processing engines within the SPM 310, in which case processing will take place over consecutive clock cycles. Since each SPM 310 can support up to G thread groups concurrently, it follows that up to G*M thread groups can be executing in GPC 208 at any given time.

Additionally, a plurality of related thread groups may be active (in different phases of execution) at the same time within an SPM 310. This collection of thread groups is referred to herein as a "cooperative thread array" ("CTA") or "thread array." The size of a particular CTA is equal to m*k, where k is the number of concurrently executing threads in a thread group and is typically an integer multiple of the number of parallel processing engines within the SPM 310, and m is the number of thread groups simultaneously active within the SPM 310. The size of a CTA is generally determined by the programmer and the amount of hardware resources, such as memory or registers, available to the CTA.

Each SPM 310 contains an L1 cache (not shown) or uses space in a corresponding L1 cache outside of the SPM 310 that is used to perform load and store operations. Each SPM 310 also has access to L2 caches within the partition units 215 that are shared among all GPCs 208 and may be used to transfer data between threads. Finally, SPMs 310 also have access to off-chip "global" memory, which can include, e.g., parallel processing memory 204 and/or system memory 104. It is to be understood that any memory external to PPU 202 may be used as global memory. Additionally, an L1.5 cache 335 may be included within the GPC 208, configured to receive and hold data fetched from memory via memory interface 214 requested by SPM 310, including instructions, uniform data, and constant data, and provide the requested data to SPM 310. Embodiments having multiple SPMs 310 in GPC 208 beneficially share common instructions and data cached in L1.5 cache 335.

Each GPC 208 may include a memory management unit (MMU) 328 that is configured to map virtual addresses into physical addresses. In other embodiments, MMU(s) 328 may reside within the memory interface 214. The MMU 328 includes a set of page table entries (PTEs) used to map a virtual address to a physical address of a tile and optionally a cache line index. The MMU 328 may include address translation lookaside buffers (TLB) or caches which may reside within multiprocessor SPM 310 or the L1 cache or GPC 208. The physical address is processed to distribute surface data access locality to allow efficient request interleaving among partition units. The cache line index may be used to determine whether of not a request for a cache line is a hit or miss.

In graphics and computing applications, a GPC 208 may be configured such that each SPM 310 is coupled to a texture unit 315 for performing texture mapping operations, e.g., determining texture sample positions, reading texture data, and filtering the texture data. Texture data is read from an internal texture L1 cache (not shown) or in some embodiments from the L1 cache within SPM 310 and is fetched from an L2 cache, parallel processing memory 204, or system memory 104, as needed. Each SPM 310 outputs processed tasks to work distribution crossbar 330 in order to provide the processed task to another GPC 208 for further processing or to store the processed task in an L2 cache, parallel processing memory 204, or system memory 104 via crossbar unit 210. A preROP (pre-raster operations) 325 is configured to receive data from SPM 310, direct data to ROP units within partition units 215, and perform optimizations for color blending, organize pixel color data, and perform address translations.

It will be appreciated that the core architecture described herein is illustrative and that variations and modifications are possible. Any number of processing units, e.g., SPMs 310 or texture units 315, preROPs 325 may be included within a GPC 208. Further, while only one GPC 208 is shown, a PPU 202 may include any number of GPCs 208 that are advantageously functionally similar to one another so that execution behavior does not depend on which GPC 208 receives a particular processing task. Further, each GPC 208 advantageously operates independently of other GPCs 208 using separate and distinct processing units, L1 caches, and so on.

Figure 3B:
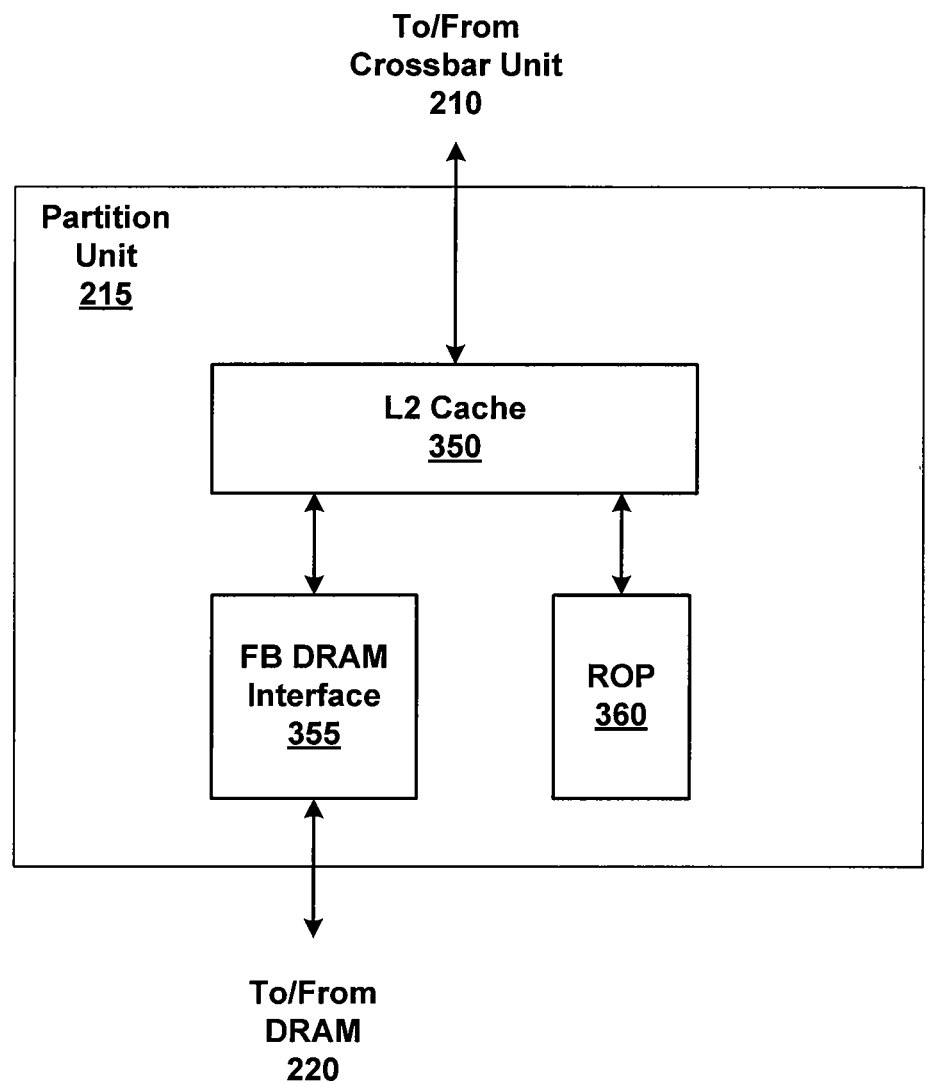
FIG. 3B is a block diagram of a partition unit within one of the PPUs of FIG. 2, according to one embodiment of the present invention.

FIG. 3B is a block diagram of a partition unit 215 within one of the PPUs 202 of FIG. 2, according to one embodiment of the present invention. As shown, partition unit 215 includes a L2 cache 350, a frame buffer (FB) DRAM interface 355, and a raster operations unit (ROP) 360. L2 cache 350 is a read/write cache that is configured to perform load and store operations received from crossbar unit 210 and ROP 360. Read misses and urgent writeback requests are output by L2 cache 350 to FB DRAM interface 355 for processing. Dirty updates are also sent to FB 355 for opportunistic processing. FB 355 interfaces directly with DRAM 220, outputting read and write requests and receiving data read from DRAM 220.

In graphics applications, ROP 360 is a processing unit that performs raster operations, such as stencil, z test, blending, and the like, and outputs pixel data as processed graphics data for storage in graphics memory. In some embodiments of the present invention, ROP 360 is included within each GPC 208 instead of partition unit 215, and pixel read and write requests are transmitted over crossbar unit 210 instead of pixel fragment data.

The processed graphics data may be displayed on display device 110 or routed for further processing by CPU 102 or by one of the processing entities within parallel processing subsystem 112. Each partition unit 215 includes a ROP 360 in order to distribute processing of the raster operations. In some embodiments, ROP 360 may be configured to compress z or color data that is written to memory and decompress z or color data that is read from memory.

Persons skilled in the art will understand that the architecture described in FIGS. 1, 2, 3A, and 3B in no way limits the scope of the present invention and that the techniques taught herein may be implemented on any properly configured processing unit, including, without limitation, one or more CPUs, one or more multi-core CPUs, one or more PPUs 202, one or more GPCs 208, one or more graphics or special purpose processing units, or the like, without departing the scope of the present invention.

In embodiments of the present invention, it is desirable to use PPU 122 or other processor(s) of a computing system to execute general-purpose computations using thread arrays. Each thread in the thread array is assigned a unique thread identifier ("thread ID") that is accessible to the thread during its execution. The thread ID, which can be defined as a one-dimensional or multi-dimensional numerical value controls various aspects of the thread's processing behavior. For instance, a thread ID may be used to determine which portion of the input data set a thread is to process and/or to determine which portion of an output data set a thread is to produce or write.

A sequence of per-thread instructions may include at least one instruction that defines a cooperative behavior between the representative thread and one or more other threads of the thread array. For example, the sequence of per-thread instructions might include an instruction to suspend execution of operations for the representative thread at a particular point in the sequence until such time as one or more of the other threads reach that particular point, an instruction for the representative thread to store data in a shared memory to which one or more of the other threads have access, an instruction for the representative thread to atomically read and update data stored in a shared memory to which one or more of the other threads have access based on their thread IDs, or the like. The CTA program can also include an instruction to compute an address in the shared memory from which data is to be read, with the address being a function of thread ID. By defining suitable functions and providing synchronization techniques, data can be written to a given location in shared memory by one thread of a CTA and read from that location by a different thread of the same CTA in a predictable manner. Consequently, any desired pattern of data sharing among threads can be supported, and any thread in a CTA can share data with any other thread in the same CTA. The extent, if any, of data sharing among threads of a CTA is determined by the CTA program; thus, it is to be understood that in a particular application that uses CTAs, the threads of a CTA might or might not actually share data with each other, depending on the CTA program, and the terms "CTA" and "thread array" are used synonymously herein.

Figure 3C:
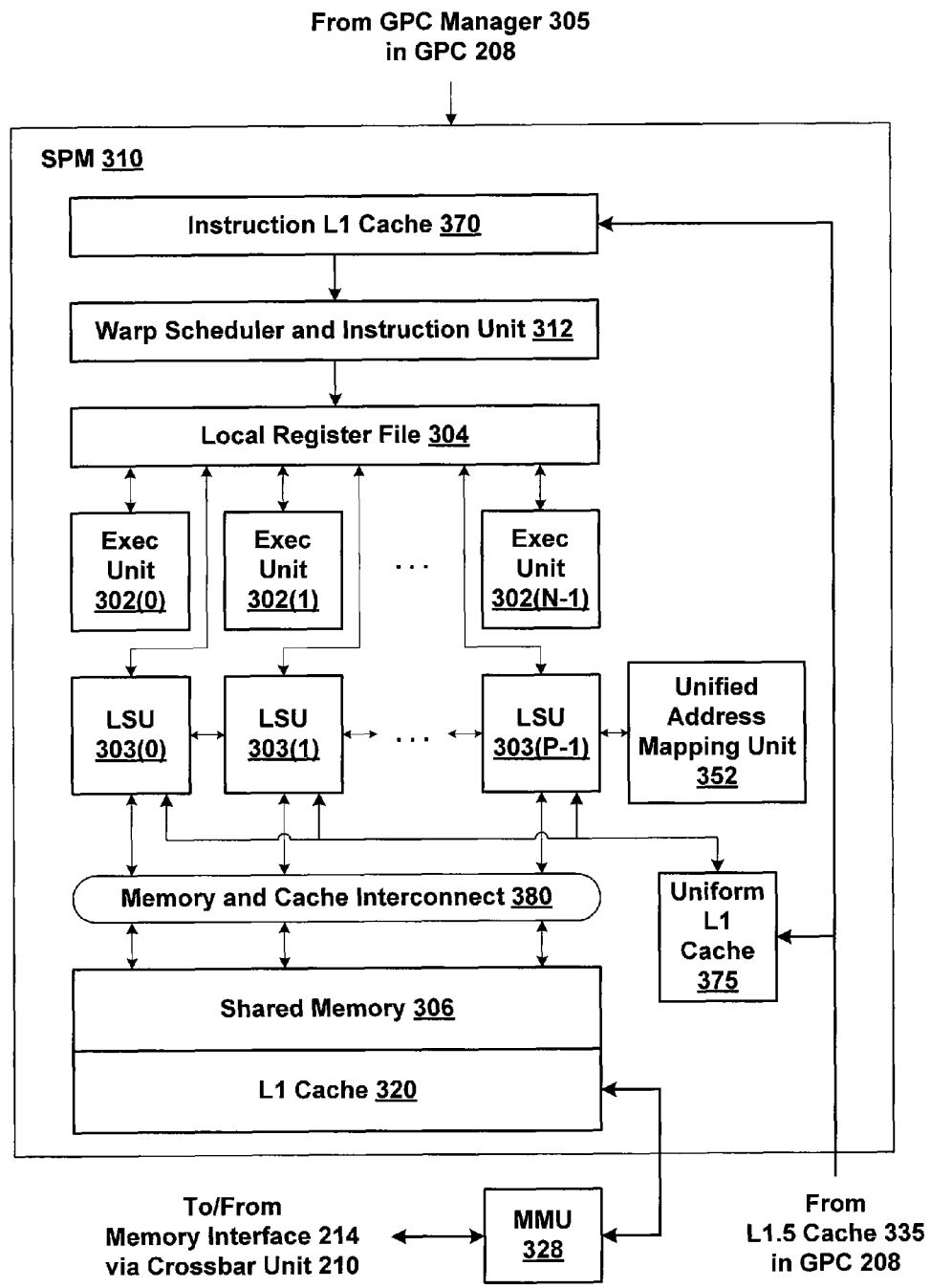
FIG. 3C is a block diagram of a portion of the SPM of FIG. 3A, according to one embodiment of the present invention.

FIG. 3C is a block diagram of the SPM 310 of FIG. 3A, according to one embodiment of the present invention. The SPM 310 includes an instruction L1 cache 370 that is configured to receive instructions and constants from memory via L1.5 cache 335. A warp scheduler and instruction unit 312 receives instructions and constants from the instruction L1 cache 370 and controls local register file 304 and SPM 310 functional units according to the instructions and constants. The SPM 310 functional units include N exec (execution or processing) units 302 and P load-store units (LSU) 303.

SPM 310 provides on-chip (internal) data storage with different levels of accessibility. Special registers (not shown) are readable but not writeable by LSU 303 and are used to store parameters defining each CTA thread's "position." In one embodiment, special registers include one register per CTA thread (or per exec unit 302 within SPM 310) that stores a thread ID; each thread ID register is accessible only by a respective one of the exec unit 302. Special registers may also include additional registers, readable by all CTA threads (or by all LSUs 303) that store a CTA identifier, the CTA dimensions, the dimensions of a grid to which the CTA belongs, and an identifier of a grid to which the CTA belongs. Special registers are written during initialization in response to commands received via front end 212 from device driver 103 and do not change during CTA execution.

A parameter memory (not shown) stores runtime parameters (constants) that can be read but not written by any CTA thread (or any LSU 303). In one embodiment, device driver 103 provides parameters to the parameter memory before directing SPM 310 to begin execution of a CTA that uses these parameters. Any CTA thread within any CTA (or any exec unit 302 within SPM 310) can access global memory through a memory interface 214. Portions of global memory may be stored in the L1 cache 320.

Local register file 304 is used by each CTA thread as scratch space; each register is allocated for the exclusive use of one thread, and data in any of local register file 304 is accessible only to the CTA thread to which it is allocated. Local register file 304 can be implemented as a register file that is physically or logically divided into P lanes, each having some number of entries (where each entry might store, e.g., a 32-bit word). One lane is assigned to each of the N exec units 302 and P load-store units LSU 303, and corresponding entries in different lanes can be populated with data for different threads executing the same program to facilitate SIMD execution. Different portions of the lanes can be allocated to different ones of the G concurrent thread groups, so that a given entry in the local register file 304 is accessible only to a particular thread. In one embodiment, certain entries within the local register file 304 are reserved for storing thread identifiers, implementing one of the special registers.

Shared memory 306 is accessible to all CTA threads (within a single CTA); any location in shared memory 306 is accessible to any CTA thread within the same CTA (or to any processing engine within SPM 310). Shared memory 306 can be implemented as a shared register file or shared on-chip cache memory with an interconnect that allows any processing engine to read from or write to any location in the shared memory. In other embodiments, shared state space might map onto a per-CTA region of off-chip memory, and be cached in L1 cache 320. The parameter memory can be implemented as a designated section within the same shared register file or shared cache memory that implements shared memory 306, or as a separate shared register file or on-chip cache memory to which the LSUs 303 have read-only access. In one embodiment, the area that implements the parameter memory is also used to store the CTA ID and grid ID, as well as CTA and grid dimensions, implementing portions of the special registers. Each LSU 303 in SPM 310 is coupled to a unified address mapping unit 352 that converts an address provided for load and store instructions that are specified in a unified memory space into an address in each distinct memory space. Consequently, an instruction may be used to access any of the local, shared, or global memory spaces by specifying an address in the unified memory space.

The L1 Cache 320 in each SPM 310 can be used to cache private per-thread local data and also per-application global data. In some embodiments, the per-CTA shared data may be cached in the L1 cache 320. The LSUs 303 are coupled to a uniform L1 cache 371, the shared memory 306, and the L1 cache 320 via a memory and cache interconnect 380. The uniform L1 cache 371 is configured to receive read-only data and constants from memory via the L1.5 Cache 335.

Figure 4:
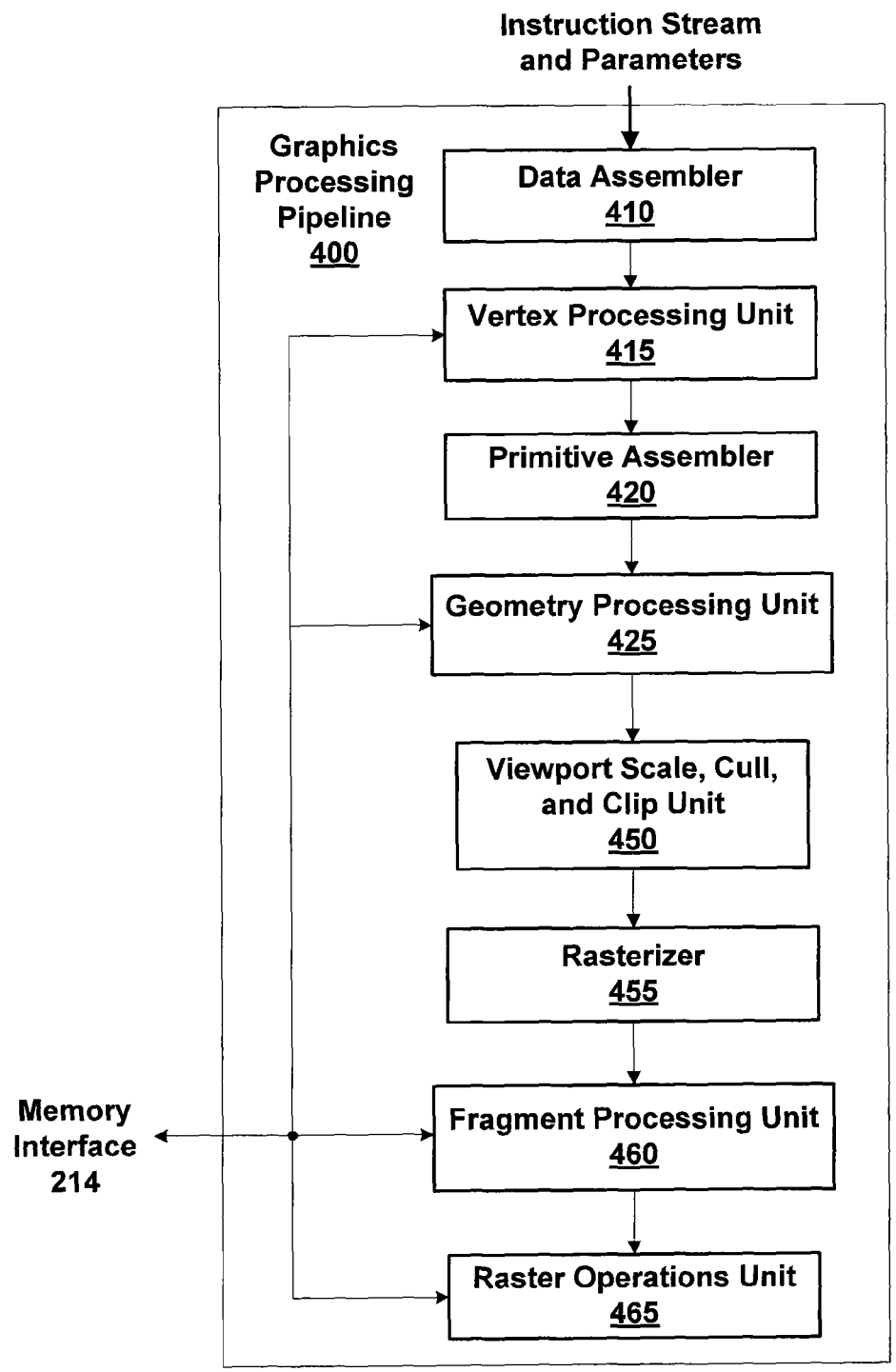
FIG. 4 is a conceptual diagram of a graphics processing pipeline that one or more of the PPUs of FIG. 2 can be configured to implement, according to one embodiment of the present invention.

FIG. 4 is a conceptual diagram of a graphics processing pipeline 400, that one or more of the PPUs 202 of FIG. 2 can be configured to implement, according to one embodiment of the present invention. For example, one of the SPMs 310 may be configured to perform the functions of one or more of a vertex processing unit 415, a geometry processing unit 425, and a fragment processing unit 460. The functions of data assembler 410, primitive assembler 420, rasterizer 455, and raster operations unit 465 may also be performed by other processing engines within a GPC 208 and a corresponding partition unit 215. Alternately, graphics processing pipeline 400 may be implemented using dedicated processing units for one or more functions.

Data assembler 410 processing unit collects vertex data for high-order surfaces, primitives, and the like, and outputs the vertex data, including the vertex attributes, to vertex processing unit 415. Vertex processing unit 415 is a programmable execution unit that is configured to execute vertex shader programs, lighting and transforming vertex data as specified by the vertex shader programs. For example, vertex processing unit 415 may be programmed to transform the vertex data from an object-based coordinate representation (object space) to an alternatively based coordinate system such as world space or normalized device coordinates (NDC) space. Vertex processing unit 415 may read data that is stored in L1 cache 320, parallel processing memory 204, or system memory 104 by data assembler 410 for use in processing the vertex data.

Primitive assembler 420 receives vertex attributes from vertex processing unit 415, reading stored vertex attributes, as needed, and constructs graphics primitives for processing by geometry processing unit 425. Graphics primitives include triangles, line segments, points, and the like. Geometry processing unit 425 is a programmable execution unit that is configured to execute geometry shader programs, transforming graphics primitives received from primitive assembler 420 as specified by the geometry shader programs. For example, geometry processing unit 425 may be programmed to subdivide the graphics primitives into one or more new graphics primitives and calculate parameters, such as plane equation coefficients, that are used to rasterize the new graphics primitives.

In some embodiments, geometry processing unit 425 may also add or delete elements in the geometry stream. Geometry processing unit 425 outputs the parameters and vertices specifying new graphics primitives to a viewport scale, cull, and clip unit 450. Geometry processing unit 425 may read data that is stored in parallel processing memory 204 or system memory 104 for use in processing the geometry data. Viewport scale, cull, and clip unit 450 performs clipping, culling, and viewport scaling and outputs processed graphics primitives to a rasterizer 455.

Rasterizer 455 scan converts the new graphics primitives and outputs fragments and coverage data to fragment processing unit 460. Additionally, rasterizer 455 may be configured to perform z culling and other z-based optimizations.

Fragment processing unit 460 is a programmable execution unit that is configured to execute fragment shader programs, transforming fragments received from rasterizer 455, as specified by the fragment shader programs. For example, fragment processing unit 460 may be programmed to perform operations such as perspective correction, texture mapping, shading, blending, and the like, to produce shaded fragments that are output to raster operations unit 465. Fragment processing unit 460 may read data that is stored in parallel processing memory 204 or system memory 104 for use in processing the fragment data. Fragments may be shaded at pixel, sample, or other granularity, depending on the programmed sampling rate.

Raster operations unit 465 is a processing unit that performs raster operations, such as stencil, z test, blending, and the like, and outputs pixel data as processed graphics data for storage in graphics memory. The processed graphics data may be stored in graphics memory, e.g., parallel processing memory 204, and/or system memory 104, for display on display device 110 or for further processing by CPU 102 or parallel processing subsystem 112. In some embodiments of the present invention, raster operations unit 465 is configured to compress z or color data that is written to memory and decompress z or color data that is read from memory.

Although the method steps are described in conjunction with the systems of FIGS. 1, 2, 3A, 3B, and 3C, persons skilled in the art will understand that any system configured to perform the method steps, in any order, is within the scope of the inventions.

Pixel Shader Output Map

In order to support the various features and capabilities specified by different graphics APIs, e.g., OpenGL®, Microsoft's DX10, and the like, the processing units within the graphics processing pipeline 400 are configurable to support these features and capabilities. More specifically, a shader program may specify that one or more components of one or more output vectors are emitted by a fragment processing unit 460 to a raster operations unit (ROP) 465. An application program may use several different fragment shader programs in its lifetime, though only one at a time. The application program interfaces provide a method to specify one or more render targets that should be rendered to. Each of these render targets is generally stored in framebuffer memory, and has one or more components of data per pixel. Additionally, the application program interfaces provide a method to specify a per-component write mask, allowing writes to specified components of a render target to be disabled. Finally, some application program interfaces provide a configurable mapping between output vectors emitted by the shader program and the render targets, allowing each render target to receive data from any one of the output vectors. The processing units within the graphics processing pipeline 400 determine the combination of components to generate and write to the different render targets based on the features and capabilities specified by the application program.

In one embodiment of this invention, the device driver 103 uses one SetPipeline[PIXEL].Program command to bind the pixel shader program and to set the pixel shader program's compile-time parameters that are needed by the processing units within the graphics processing pipeline 400. The SetPipeline[PIXEL].Program command sets a pointer to a pixel shader program and the pixel shader program's SPH (shader program header). When a shader program is compiled, the compiler (or related software) not only generates the executable code, but also computes additional parameters needed by the fragment processing unit 460 and raster operations unit (ROP) 465 within the graphics processing pipeline 400. These parameters are placed (usually by the device driver 103) into the SPH. Some SPH fields are used by the fragment processing unit 460 to determine which components to send to the ROP unit 465 and write to one or more render targets.

At the high level, embodiments of the invention allow the compiler to indicate, on a per-component basis, the output components that are generated by the fragment processing unit 460 when the pixel shader is executed. The components enabled by the SPH may not match the components to be written according to a render target write enable mask since the write enable mask is defined at the application program level, not at the pixel shader program level. Differences between the SPH mask and the target write enable mask are reconciled in the fragment processing unit 460 and ROP 465 so that the device driver 103 does not need to override the per-component write enables to ensure that components that are not enabled by the SPH are not written to a render target. The device driver 103 advantageously only needs to bind render targets to the binding slots, as specified by the application program.

Further complicating the generation and writing of the components, the OpenGL® API provides the command glDrawBuffers( ) permitting applications to shuffle or remap the render target order so that a vector of components generated by the fragment processing unit 460 may be dynamically remapped to an arbitrary render target. In the preferred embodiment of this invention, software and hardware performance of the graphics processing pipeline 400 is improved when a SetCtSelect command is used to remap the vectors to different render targets, thereby allowing any vector to be sent to any render target. Without such a mechanism, the device driver 103 would be required incur overhead cross-checking the render targets, draw buffer remapping, and the pixel shader program whenever any of these changes. The ROP 465 is configured to perform the remapping of the vectors from one render target to another when the render target order is shuffled by the SetCtSelect command.

The ROP 465 may also be configured to write a single vector of components to multiple render targets. A SetCtMrtEnable command allows the device driver 103 to dynamically disable the multiple render target (MRT) behavior of the active pixel shader that writes a different vector to each render target. Disabling the MRT behavior is used to preserve OpenGL glDrawBuffer( ) semantics with MRT enabled pixel shaders, where a single output vector is written to all enabled render targets, regardless of the number of outputs in the pixel shader.

Figure 7A:
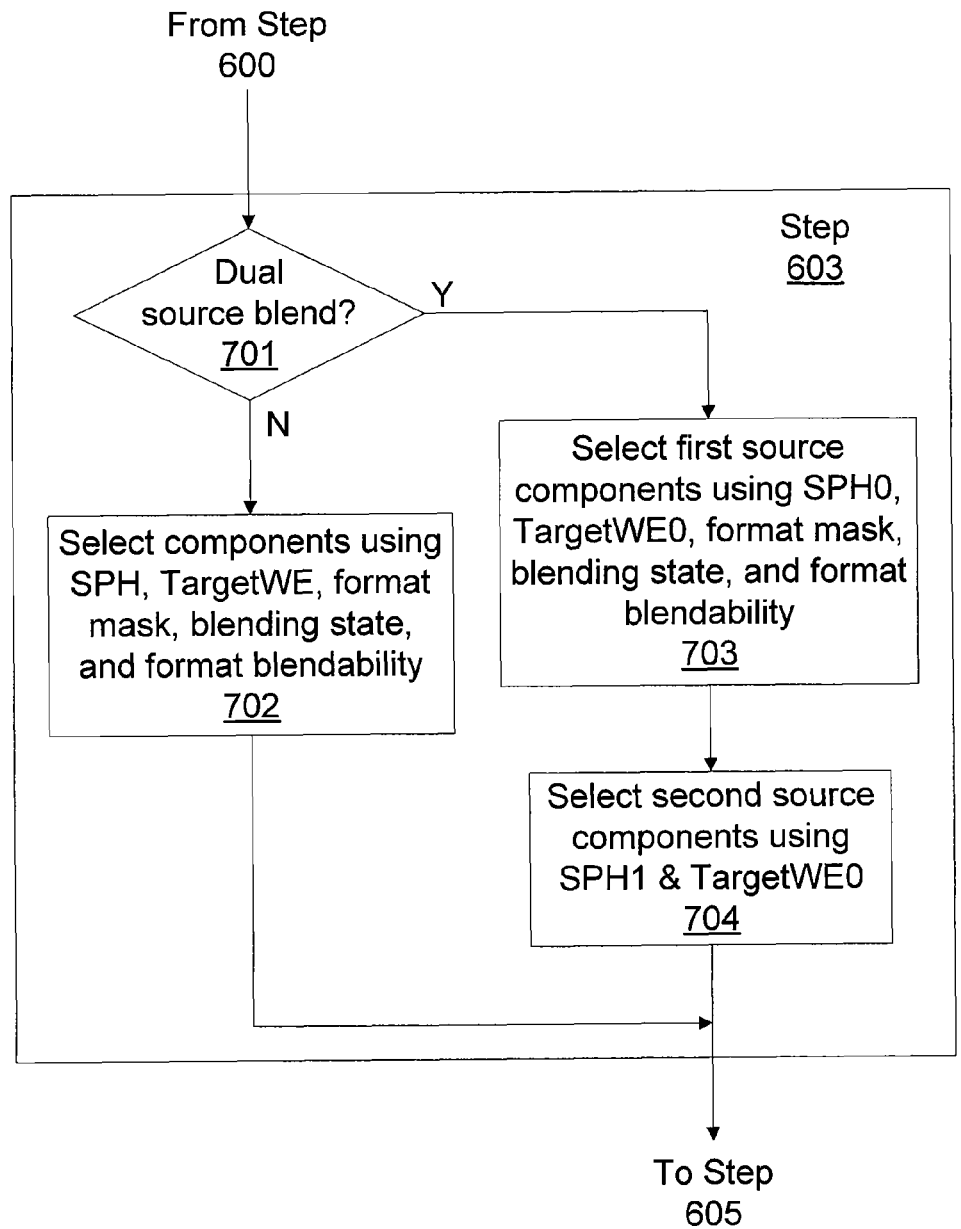
FIG. 7A is a flow diagram of a step shown in FIG. 6A, according to one embodiment of the present invention.
Figure 7B:
FIG. 7B illustrates the different component masks and vector remapping performed by the pixel shader and ROP unit for the dual source blending mode, according to one embodiment of the present invention.

The ROP 465 may also be configured to perform dual-source blending (DSB) for multiple render targets, where a pair of outputs are sent to each render target for blending with the current contents of the render target, as explained in conjunction with FIGS. 7A and 7B.

Figure 5A:
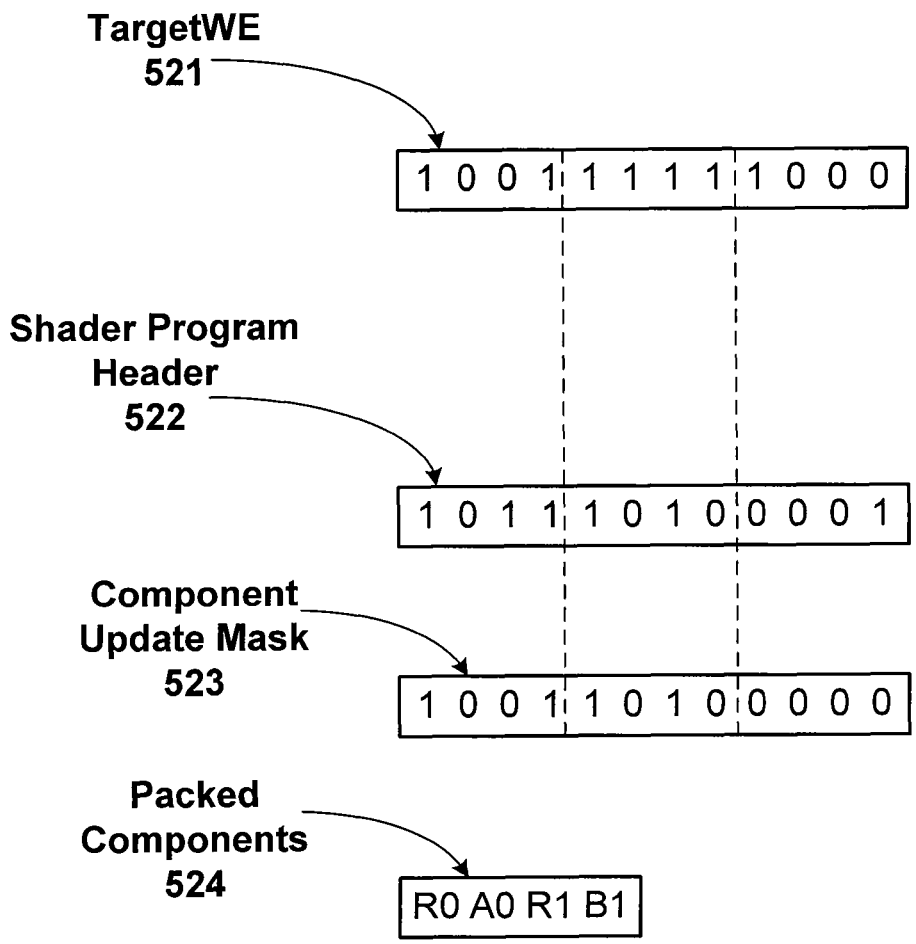
FIG. 5A is a conceptual diagram of the per-component masks and combined per-component mask, according to one embodiment of the present invention.

FIG. 5A is a conceptual diagram of the per-component masks and combined per-component mask, according to one embodiment of the present invention. A component-level write enable mask for the render target, targetWE 521, is specified by the application program. A component-level output mask field that specifies the components to be generated by the fragment shader 460 is included in the shader program header (SPH) 522. As shown in FIG. 5A these masks include four components for three vectors. Assuming that the components for each vector are color components red, green, blue, and alpha (RGBA), then the targetWE 521 indicates that the R and A components are enabled for the first color target, the R, B, G, and A components are enabled for the second color target, and only the R component is enabled for the third color target. The SPH 522 indicates that the R, B, and A components are generated for the first output vector, the R and B components are generated for the second vector, and only the A component is generated for the third vector. Clearly, different components are enabled/generated by the different masks.

A component update mask 523 is produced as a combination of the targetWE 521 and the SPH 522 by performing a bitwise AND operation between the two masks. The component update mask 523 indicates that the R and A components are enabled for the first vector, the R and B components are enabled for the second vector, and no components are enabled for the third vector. The component update mask 523 may be used by the fragment processing unit 460 to only generate components that will be written to a render target. Since writing a render target component that is not generated should be avoided in order to comply with an API requirement, the ROP 465 is configured to write only components enabled by the targetWE 521. Components enabled for writes that are not generated by the fragment processing unit 460 are written with a default value. A single targetWE 521 may be specified by the application program and reconciled with different SPHs 522 by the fragment processing unit 460 and ROP 465 without any intervention by the device driver 103.

When one or more components are not enabled according to the component update mask 523, the enabled components output by fragment processing unit 460 are preferably packed at the component granularity for output to the ROP 465, thereby conserving bandwidth. Packed components 524 includes the R and A components for the first vector (R0 and A0) and the R and B components for the second vector (R1 and B1). No components are output for the third vector. The registers needed to store the components may be used more efficiently since only components generated according to the SPH are stored compared with storing all of the components for each vector, allowing more shader programs to execute concurrently when the number of registers is limited.

Figure 5B:
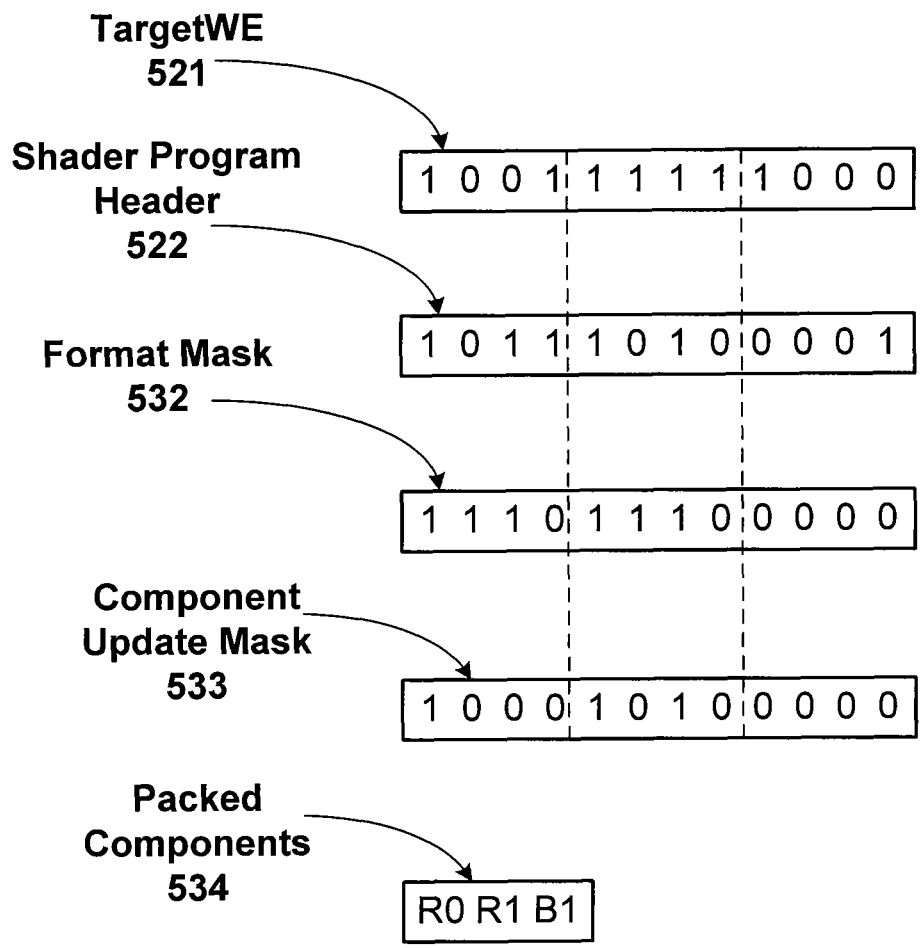
FIG. 5B is another conceptual diagram of the per-component masks and combined per-component mask, according to one embodiment of the present invention.

FIG. 5B is another conceptual diagram of the per-component masks and combined per-component mask, according to one embodiment of the present invention. As previously explained, the targetWE 521 is specified by the application program and the SPH 522 is specified by a pixel shader program. In addition, a SetColorTarget format mask 532 may be specified for each target that enables/disables components for that target. Each color target has an optional bound image stored in graphics memory, in which each pixel has the same specific format. In this example, the first and second render targets have images bound with R, G, and B components only. The third render target has no image bound, and is thus considered to have no components. The format mask 532 indicates that the R, G, and B components are enabled for the first and second vectors and no components are enabled for the third vector.

A component update mask 533 is produced as a combination of the independently specified targetWE 521, the SPH 522, and the format mask 532 by performing a bitwise AND operation between the three masks. The component update mask 533 indicates that the R component is enabled for the first vector, the R and B components are enabled for the second vector, and no components are enabled for the third vector. The component update mask 533 may be used by the fragment processing unit 460 to only transmit components from the pixel shader to the ROP 365 that will be written to a render target. Since a component that is not generated should not be written to a render target in order to comply with an API requirement, the ROP 465 is configured to write only components enabled by the targetWE 521 and that are enabled by the format mask 532. Components that are not generated by the fragment processing unit 460 are written with a default value. A different targetWE 521 and format mask 533 may be specified by the application program for each one of the render targets and reconciled with different SPHs 522 by the fragment processing unit 460 and ROP 465 without any intervention by the device driver 103.

When one or more components are not enabled according to the component update mask 533, the enabled components output by fragment processing unit 460 are packed at the component granularity for output to the ROP 365, thereby conserving bandwidth. Packed components 534 includes only the R component for the first vector (R0) and the R and B components for the second vector (R1 and B1). No components are output for the third vector. The registers needed to store the components may be used more efficiently since only components generated according to the SPH are stored compared with storing all of the components for each vector, allowing more shader programs to execute concurrently when the number of registers is limited.

A special case arises in some embodiments when blending is enabled and blending is performed in the ROP unit 465. Blending provides a set of well-known configurable modes where the final values stored by the ROP 465 are a function of the fragment shader outputs, the current contents of framebuffer memory, and various other pieces of state. Some blending configurations will allow the A component output by the fragment shader to affect the final results on the R, G, and B components. In such cases, the A component generated by the fragment shader 460 must be sent to ROP 465 even if the corresponding A component bit in TargetWE 521 is zero or the corresponding A component bit in FormatMask 532 is zero. In the context of FIG. 5B, if blending is enabled for the first two render targets and the blend modes are programmed such that the alpha output affects R, G, B channels, then the Component Update Mask is set to 1001-1011-0000. In some APIs, blending can be enabled on targets individually. In some APIs, some target formats are not blendable, so continuing with the example, if the first render target is blendable and the second target is not blendable, then the Component Update Mask is set to 1001-1010-000. This special case involving also applies to FIG. 5A and to subsequent examples.

Figure 5C:
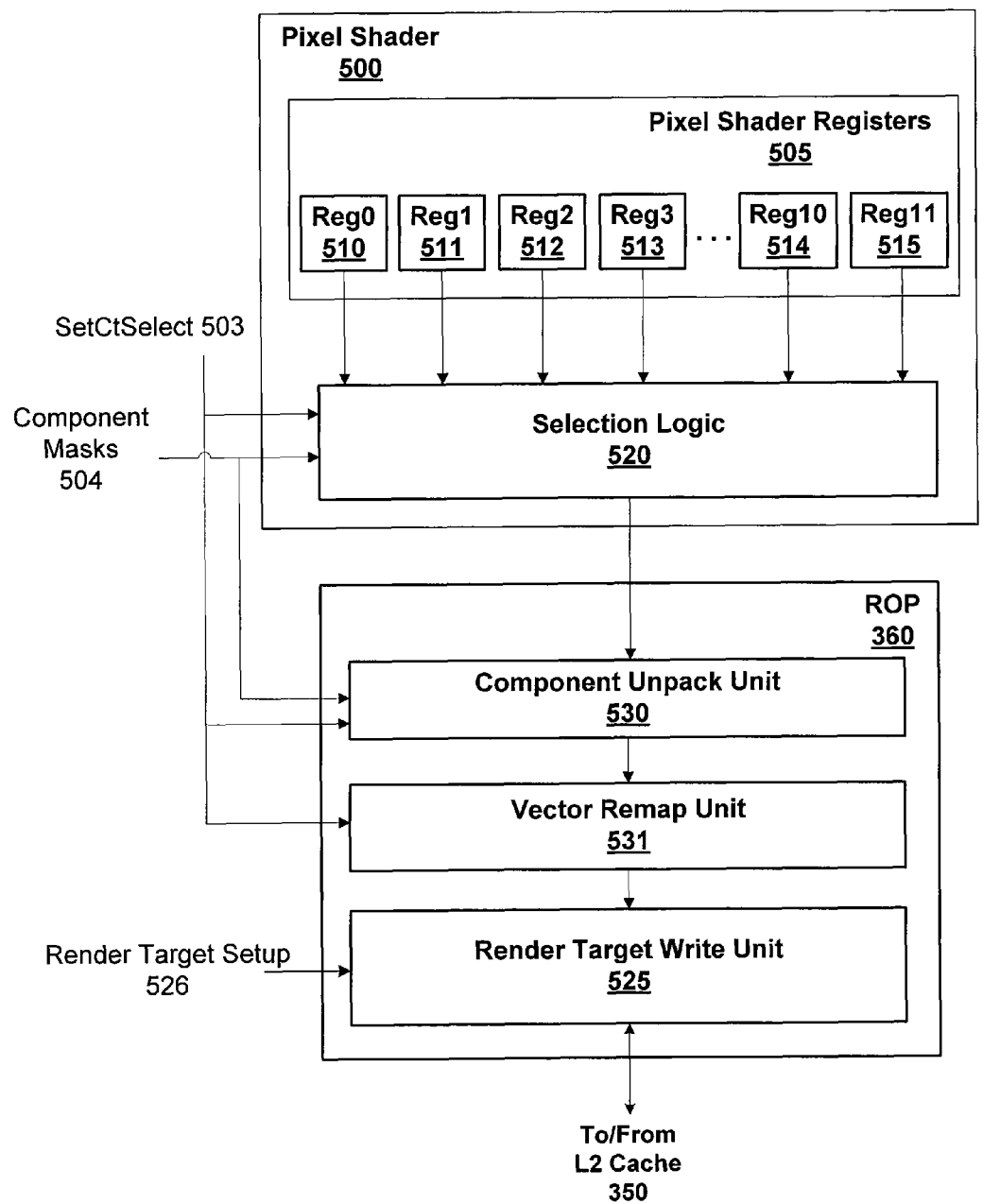
FIG. 5C is a block diagram of another portion of the SPM of FIG. 3A, according to one embodiment of the present invention.

FIG. 5C is a block diagram of another portion of the SPM 310 of FIG. 3A, according to one embodiment of the present invention. The SPM 310 may be configured to perform functions of the fragment processing unit 460 and ROP 465 using a pixel shader 500 and the ROP 360 (see FIG. 3B). The pixel shader 500 includes a pixel shader registers 505 with one or more registers (reg0 510, reg1 511, reg2 512, reg3 513, . . . reg10 514, and reg11 515) that are each configured to store a component that is generated according to a SPH. For example, when the components specified by SPH 522 are stored in the pixel shader registers 505, reg0 510, reg1 511, and reg2 512 may be allocated to store R0, B0, and A0, respectively, reg3 513 may be allocated to store R1 and two additional registers may be allocated to store B1 and A2.

A selection logic 520 combines two or more component masks, e.g., SPH specified by a pixel shader program, the targetWE specified by the application program, the format mask, the blending state, and the format blendability to produce the component update mask. The component update mask is used to select one or more components stored in the pixel shader registers 505 for output to the ROP 530. The selected components are then packed at a component granularity and output to the ROP 530. The components may be output by the selection logic 520 serially or in parallel. The ROP 350 includes a component unpack unit 530, a vector remap unit 531, and a render target write unit 525. The component unpack unit 530 unpacks the packed components based on the component masks used to produce the component update mask.

Format blendability is determined based on the blending enables and the component format. Some formats are not considered to be blendable and therefore have a "false" blendability. Blending is defined in graphics APIs as a floating-point operation. As a result, an API typically specifies that blending state is ignored and treated as disabled when addressing an integer framebuffer format. Only floating-point framebuffer formats are considered blendable.

The unpacked components are output to the vector remap unit 531 and remapped or shuffled according to a SetCtSelect 503 specified by the application program. The SetCtSelect 503 determines the one-to-one mapping between the vectors and the render targets. Without support for the remapping of the vectors that is required by the OpenGL API, the OpenGL driver would need to shuffle the render target bindings, potentially on every state change involving the pixel shader, render targets, or render target selection, which is a significant overhead. Thus, software and hardware performance is improved by providing the remapping function in the ROP 360. When the SetCtSelect 503 specifies a mapping that reorders the render targets relative to the vectors, i.e., vector0 is not output to render target0, vector1 is not output to render target1, and so on, the SetCtSelect 503 is used by the selection logic 520 to combine the remapped targetWE and/or format mask with the corresponding SPH for the vector.

The optionally remapped vectors are received by the render target write unit 525 and output to one or more render targets based on a render target setup 526. The render target write unit 525 can be configured to perform blending, or a separate blending unit can perform blending. The render target setup 526 may be specified by the SetCtMrtEnable method that allows the device driver 103 to dynamically enable and disable the MRT behavior. In particular, a single vector may be output to all of the enabled render targets to preserve OpenGL glDrawBuffer( ) semantics. Finally, the optionally remapped vectors are output and written to one or more render targets via the L2 cache 350 (see FIG. 3B).

Figure 6A:
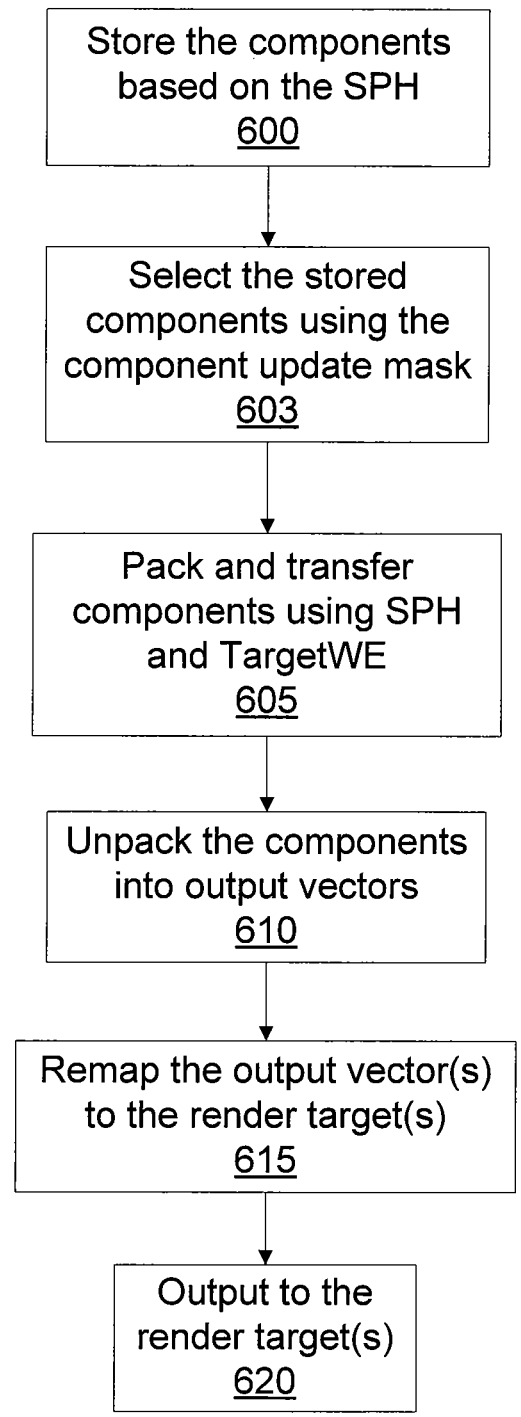
FIG. 6A is a flow diagram of steps for storing, transferring, and shuffling the components, according to one embodiment of the present invention.

FIG. 6A is a flow diagram of steps for storing, transferring, and remapping the components, according to one embodiment of the present invention. At step 600 the components generated according to the SPH are stored in registers of the pixel shader registers 505. At step 603 the generated components are selected by the selection logic 520 using the component update mask and the SetCtSelect 523. At step 605 the selected components are packed and transferred to the ROP 365 by the selection logic 520. The selected components may be transmitted by the selection logic 520 to the ROP 365 in target order, starting with target 0 or the selected components may be output in vector order, starting with vector 0. Target order is preferred for non-MRT and dual-source blending modes. Furthermore, when none of the components are selected for packing and transmission to the ROP 365 then no components are output for the corresponding render target.

At step 610 the packed components are unpacked by the component unpack unit 530 according to the transmit order and component update mask to produce output vectors. In one embodiment, when the SPH specifies that a component is not output, but the component is enabled for writes, the corresponding component is filled with a default value in the output vector. At step 615 the output vectors are remapped by the vector remap unit 531 according to the SetCtSelect 503 to produce remapped output vectors for each enabled render target. At step 620 the remapped output vectors are output and written to the render target(s) according to the render target setup 526 by the render target write unit 525. In one embodiment, the render target write unit 525 only writes components that are enabled according to the targetWE. In other embodiments, the render target write unit 525 only writes components that are enabled according to the format mask. In still other embodiments, the render target write unit 525 only writes components that are enabled according to the format mask ANDed with the targetWE.

Figure 6B:
FIG. 6B illustrates the different component masks and vector remapping performed by the pixel shader and ROP unit for the multiple render target mode, according to one embodiment of the present invention.

FIG. 6B illustrates the different component masks and vector remapping performed by the pixel shader 500 and ROP 365 for an OpenGL API MRT mode shader 630, according to one embodiment of the present invention. The MRT (multiple render target) mode is enabled by the pixel shader program and the device driver 103 also enables multiple render target behavior. In the SetCtSelect method, a targetcount field sets the number of pixel shader vectors and potential corresponding color targets. Fields for each target (8 targets in the example) set the correspondence between a pixel shader vector (as numbered in the SPH) and color target buffers. For example, if target3 is 2, then the pixel shader's third output is sent to the color target configured by the methodgroup SetColorTarget[2]. The device driver 103 for the OpenGL API uses method SetCtSelect to select an output count and remap pixel shader outputs to ROP targets. The device driver 103 for other APIs may maintain a straight-thru mapping from each pixel shader output to ROP target, i.e., there is no remapping so vector 0 is mapped to target0 , vector 1 is mapped to target1, and so on.

The pixel shader (PS) output vectors 621 include 8 different vectors. The components that are included for each vector are shown in SPH 623 and the PS registers 622 specifies the pixel shader registers 505 that are allocated for storing the components. The SetCtSelect (shuffle) 624 specifies the remapping of pixel shader vectors to render targets. The targetWE 625 is the write enable mask for each render target. In this example, the format mask is not used to produce the component update mask. The register to RGBA 626 indicates the PS register that is output for each component of the render target, where a default value of d is used when the component is not generated by the pixel shader.

The first PS output vector (0) is directed to target 6 (see 0->6 in SetCtSelect (shuffle) 624). The RGB components are generated and written using PS registers 0, 1, and 2. The targetWE for target 6 is 1110, so RGB is written to target6. The second PS output vector (1) is directed to target3 and the RG components are generated and written using PS registers 3 and 4. The targetWE for target3 is 1111, so R and G values from registers 3 and 4 plus B and A default values are written to target3. The third PS output vector (2) is directed to target1, but has no components generated or written to PS registers. The targetWE for target1 is irrelevant (X-don't care) because of the empty output vector, so nothing is output to target1. The fourth PS vector (3) is directed to target0 and only the A component is generated and written using PS register 5. The targetWE for target0 is 1011, so A from register 5 and default values for R and B are written to target0.

The fifth PS vector (4) is directed to target5 and no components are generated or written to PS registers. The targetWE for target5 is irrelevant, and nothing is output to target5. The sixth PS vector (5) is directed to target2 and the G component is generated and written using PS register 6. The targetWE for target2 is 0001. Because the combined mask is empty, the G component in PS register 6 is discarded and the default value for A is written to target2. The seventh PS vector (6) is directed to target7 and the G and A components are generated and written using PS registers 7 and 8. In this example, there is no color buffer bound to target 7, and the empty format mask 532 will ensure that nothing is output to target7. The eighth PS vector (7) is directed to target4 and the R, G, and A components are generated and written using PS registers 9, 10, and 11. The targetWE for target4 is 1000, so only the R component stored in register 9 is output to target4.

Figure 6C:
FIG. 6C illustrates the different component masks and vector remapping performed by the pixel shader and ROP unit for the non-multiple render target mode, according to one embodiment of the present invention.

FIG. 6C illustrates the different component masks and vector remapping performed by the pixel shader 500 and ROP 365 for an OpenGL non-MRT shader 640, according to one embodiment of the present invention. The non-MRT (multiple render target) mode is enabled either by the pixel shader program or by application calls received by the device driver 103. In either case, the pixel shader is treated as having a single output that is broadcast to all enabled color targets. As above, the targetcount field in the SetCtSelect method sets the number of targets that potentially receive a copy of PS vector 0. Fields for each target (8 targets in the example) indicate which targets potentially receive copies of PS vector 0.

The pixel shader (PS) vectors 641 includes 8 different vectors, but in non-MRT mode only the first vector, vector 0, is used. The components that are included for the first vector are shown in SPH 643 and the PS registers 642 specifies the pixel shader registers 505 that are allocated for storing the components. The SetCtSelect (shuffle) 644 specifies the remapping of the first pixel shader vector to one or more render targets. The format mask 647 is the per-component format enable mask for each render target. The targetWE 645 is the write enable mask for each render target. The register to RGBA 646 indicates the PS register that is output for each component of the render target, where a default value of d is used when the component is not generated by the pixel shader.

The first PS vector (0) is directed to all of the targets regardless of SetCtSelect (shuffle) 644). The RGB components are generated for vector 0 and written using PS registers 0, 1, and 2. The format mask for target0 is 1111 and the targetWE for target 0 is 1011, so R and B stored in registers 0 and 2 are written to the R and B components of target0 and the default value is written to the enabled A component of target0. No buffer is attached to targets 1, 5, and 7, so the corresponding format masks are disabled (0000). The targetWE for targets 1, 5, and 7 is irrelevant, because no components will be written to those targets due to the format mask 647. The format mask for target2 is 1110 and the targetWE for target2 is 0001, so no components of target2 will be written. Note that only components enabled by both the targetWE and the format mask are written in this example.

The format mask for target3 is 0001 and the targetWE for target3 is 1111, so only the default value is written to the A component of target3. The format mask for target4 is 1110 and the targetWE for target4 is 1000, so only the R component stored in register 0 is written to the R component of target4. The format mask for target6 is 1111 and the targetWE for target6 is 1110, so the R, G, and B components stored in registers 0, 1, and 2 are written to the R, G, and B components of target6.

A dual-source blending mode may also be enabled that operates with the non-MRT mode. The dual-source mode is enabled when at least one dual-source blended target is specified. The pixel shader vectors 0 and 1 specify two input sources that are blended with the current contents of each enabled target. The targetCount field of the SetCtSelect method sets the number of targets that potentially receive a copy of vectors 0 and 1. Fields for each target (8 targets in the example) indicate which targets potentially receive copies of PS vectors 0 and 1. Each target that is not a dual-source blending target receives only PS vector 0, effectively operating in non-MRT mode.

FIG. 7A is a flow diagram of step 603 shown in FIG. 6A, according to one embodiment of the present invention. Step 603 is performed for each one of the different render targets that are enabled. At step 701 the selection logic 520 determines if the dual source blend mode is enabled for the target, and, if not, at step 702 the selection logic 520 selects the components using the SPH bits for the corresponding color output the targetWE, format mask, blending state, and the format blendability. Otherwise, dual-source blending is used, and at step 703 the selection logic 520 selects the first source components using the SPH bits for color output zero. At step 704 the selection logic 520 selects the second source components using only the SPH bits for color output one. After completing either step 702 or 704, the pixel shader 500 proceeds to step 605.

In one embodiment, the source components are output by the pixel shader 500 for each target. In other embodiments, the source components for multiple render targets are packed and output by the pixel shader 500.

FIG. 7B illustrates the different component masks and vector remapping performed by the pixel shader 500 and ROP 365 for a dual-source blending shader 700, according to one embodiment of the present invention. A targetcount field sets the number of targets that potentially receive copies of PS vectors 0 and 1. Fields for each target (8 targets in the example) indicate which targets potentially receive copies of PS vectors 0 and 1.

The pixel shader (PS) vectors 621 could write up to 8 different vectors, but in dual-source blending mode only the first and second vectors are used. The components that are included for the first and second vectors are shown in SPH 723 and the PS registers 722 specifies the pixel shader registers 505 that are allocated for storing the components. The SetCtSelect (shuffle) 724 specifies the remapping of the first pixel shader vector to one or more render targets. The targetWE 725 is the write enable mask for each render target. The register to RGBA 726 indicates the PS register that is output for each component of the render target, where a default value of d is used when the component is not generated by the pixel shader. In this example, the format mask is not used.

The first and second PS vector are directed to all of the targets regardless of SetCtSelect (shuffle) 724) since all of the targets are dual-source. The RGB components are generated for vector 0 and written using PS registers 0, 1, and 2. The RGBA components are generated for vector 1 and written using PS registers 3, 4, 5, and 6. Components of vector 0 are selected, packed, and transmitted from the pixel shader 500 to the ROP 365 based on SPH0 and the targetWE for each one of the enabled targets. Components of vector 1 are selected, packed, and transmitted from the pixel shader 500 to the ROP 365 based only on SPH1.

The targetWE for target 0 is 1011, so R and B stored in registers 0 and 2 are provided to the R and B components of the first source for target0 and the default value is provided to the A component of the first source for target0. R, B, and A stored in registers 3, 5, and 6 are provided to the R, B, and A components of the second source for target0.

No buffer is attached to targets 1, 5, and 7, so the format mask (not depicted) is 0000, the targetWE 725 is irrelevant, and no components are written to those targets for either the first or second source. The targetWE for target2 is 0001, so the default value is provided to the A component of the first source for target2 and the A stored in register 6 is provided to the A component of the second source for target2. The targetWE for target3 is 1111, so R, G, and B stored in registers 0, 1, and 2 are provided to the R, G, and B components of the first source for target3 and the default value is provided to the A component of the first source for target3. The R, G, B, and A components stored in registers 3, 4, 5, and 6 are provided to the R, G, B, and A components of the second source for target3.

The targetWE for target4 is 1000, so the R component stored in register 0 is provided to the R component of the first source for target4 and the R component stored in register 3 is provided to the R component of the second source for target4. The targetWE for target6 is 1110, so the R, G, and B components stored in registers 0, 1, and 2 are written to the R, G, and B components of the first source for target6. The R, G, and B components stored in registers 3, 4, and 5 are written to the R, G, and B components of the second source for target6.

The SPH is used to allocate registers and store only the enabled components for each vector. The SPH component mask for each vector and the targetWE mask for each render target are combined to select and pack the components that are transmitted for each one of the render targets. One advantage of the combined mask is that the number of components that are transmitted from the pixel shader 500 to the ROP 365 is reduced, thereby saving bandwidth between those processing units. Additionally, the pixel shader 500 and ROP 365 are configured to support the MRT, non-MRT, and dual-source blending modes. Another advantage is that the device driver overhead is reduced since CPU cycles are not needed to validate every combination of the pixel shader, color target attachments (SPH component mask), and write masks (targetWE mask).

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

What is claimed is:

1. A method for selecting and transmitting components for render targets, comprising:
generating only components of a vector that are enabled according to a shader program header;
storing the components of the vector in a set of registers;
selecting a set of components from the components of the vector based on a component update mask that is a bitwise combination of a write enable mask and the shader program header;
transmitting the set of components to a render target; and
writing the set of components to the render target.

2. The method of claim 1, wherein the component update mask is a combination of a target write enable mask and a format component enable mask specified for the render target.

3. The method of claim 1, wherein the component update mask is a combination of a target write enable mask, a format component enable mask specified for the render target, a blending state, and a format blendability.

4. The method of claim 1, further comprising:
generating only components of additional vectors that are enabled according to additional shader program headers;
storing the components of the additional vectors in the set of registers;
selecting additional set of components from the components of the additional vectors based on component update masks;
transmitting the additional sets of components to additional render targets; and
writing one set of the additional sets of components to a separate one of the additional render targets.

5. The method of claim 1, further comprising:
transmitting the set of components to additional render targets; and
writing the set of components to the additional render targets.

6. The method of claim 1, further comprising:
generating only components of an additional vector that are enabled according to an additional shader program header;
storing the components of the additional vector in the set of registers;
selecting an additional set of components from the components of the additional vector based on an additional component update mask;
transmitting the additional set of components to the render target; and
writing the additional set of components to the render target.

7. The method of claim 1, further comprising the step of remapping the set of components of the vector to the render target based on a vector-to-render target remapping specified by the application program.

8. The method of claim 1, wherein a default value is inserted when the set of components is missing a component that is enabled according to a write enable mask specified for the render target by an application program.

9. The method of claim 1, wherein transmitting the set of components to the render target comprises packing the set of components on a component-by-component basis.

10. A non-transitory computer-readable storage medium storing instructions that, when executed by a processor, select and transmit components for render targets, by performing the steps of:
generating only components of a vector that are enabled according to a shader program header;
storing the components of the vector in a set of registers;
selecting a set of components from the components of the vector based on a component update mask that is a bitwise combination of a write enable mask and the shader program header;
transmitting the set of components to a render target; and
writing the set of components to the render target.

11. The non-transitory computer-readable storage medium of claim 10, wherein the component enable mask is a combination of a target write enable mask and a format component enable mask specified for the render target.

12. The non-transitory computer-readable storage medium of claim 10, wherein the component update mask is a combination of a target write enable mask, a format component enable mask specified for the render target, a blending state, and a format blendability.

13. The non-transitory computer-readable storage medium of claim 10, further comprising the step of remapping the set of components of the vector to the render target based on a vector-to-render target remapping specified by the application program.

14. The non-transitory computer-readable storage medium of claim 10, wherein a default value is inserted when the set of components is missing a component that is enabled according to a write enable mask specified for the render target by an application program.

15. A system for selecting and transmitting components for render targets, the system comprising:
a memory storing the render targets;
a pixel shader configured to:
generate only components of a vector that are enabled according to a shader program header;
store the components of the vector in a set of registers;
select a set of components from the components of the vector based on a component update mask that is a bitwise combination of a write enable mask and the shader program header; and
transmit the set of components to a render target; and
a raster operations unit configured to write the set of components to the render target.

16. The system of claim 15, wherein the component update mask is a combination of a target write enable mask and a format component enable mask specified for the render target.

17. The system of claim 15, wherein a default value is inserted when the set of components is missing a component that is enabled according to a write enable mask specified for the render target by an application program.

18. The system of claim 15, wherein the raster operations unit is further configured to remap the set of components of the vector to the render target based on a vector-to-render target remapping specified by the application program.

\* \* \* \* \*